US010592864B2

(12) United States Patent
Flutre et al.

(10) Patent No.: US 10,592,864 B2
(45) Date of Patent: Mar. 17, 2020

(54) SHARE TOKEN ISSUANCE FOR DECLARATIVE DOCUMENT AUTHORING

(71) Applicant: Microsoft Technology Licensing, LLC, Redmond, WA (US)

(72) Inventors: Arnaud Christian Flutre, Sammamish, WA (US); Yasser E. Shaaban, Seattle, WA (US); Mariyan D. Fransazov, Kirkland, WA (US); Olivier Colle, Bellevue, WA (US); Andrew Michael Pennell, Kirkland, WA (US); Anjli Chaudhry, Seattle, WA (US); William Hong Vong, Hunts Point, WA (US); Mark David Overholt, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 236 days.

(21) Appl. No.: 15/374,735

(22) Filed: Dec. 9, 2016

(65) Prior Publication Data

US 2017/0316219 A1 Nov. 2, 2017

Related U.S. Application Data

(60) Provisional application No. 62/329,098, filed on Apr. 28, 2016.

(51) Int. Cl.
*G06Q 10/10* (2012.01)
*G06F 8/71* (2018.01)
(Continued)

(52) U.S. Cl.
CPC ............. *G06Q 10/101* (2013.01); *G06F 8/71* (2013.01); *G06F 21/31* (2013.01);
(Continued)

(58) Field of Classification Search
CPC ... G06F 8/31; G06F 8/71; G06F 21/31; G06F 21/6209; G06Q 10/101; H04L 67/141
(Continued)

(56) References Cited

U.S. PATENT DOCUMENTS 6,256,773 B1    7/2001  Bowman-Amuah
6,757,893 B1 *  6/2004  Haikin ...................... G06F 8/71
                                                 717/170
(Continued)

OTHER PUBLICATIONS

Frank, et al., "Using an Interface Proxy to Host Versioned Web Services", In IEEE International Conference on Services Computing, vol. 2, Jul. 7, 2008, pp. 325-332.
(Continued)

*Primary Examiner* — Dant B Shaifer Harriman
(74) *Attorney, Agent, or Firm* — Workman Nydegger

(57) ABSTRACT

Issuance of job tokens performed by an authorization computing entity so that authoring authorizations can be shared with other authors. Each of the job tokens represents an authorization to engage in a particular manner in an authoring session in which a declarative document is being authored. That engagement includes sharing one or more authorizations with other possible author. The declarative document is a computer program in the form of a list of declarative statements made in a declarative programming language. The management occurs by evaluating incoming requests to engage in various ways in an authoring session.

20 Claims, 5 Drawing Sheets

(51) Int. Cl.
  *H04L 29/08* (2006.01)
  *G06F 21/31* (2013.01)
  *G06F 21/62* (2013.01)
  *G06F 8/41* (2018.01)
(52) U.S. Cl.
  CPC ........ *G06F 21/6209* (2013.01); *H04L 67/141* (2013.01); *G06F 8/41* (2013.01)
(58) Field of Classification Search
  USPC .......................................................... 726/4
  See application file for complete search history.

(56) References Cited

U.S. PATENT DOCUMENTS

| | | | |
|---|---|---|---|
| 6,845,387 | B1 | 1/2005 | Prestas et al. |
| 7,325,128 | B2 | 1/2008 | Wood et al. |
| 7,349,949 | B1 | 3/2008 | Connor et al. |
| 7,350,213 | B2 | 3/2008 | Deutesfeld et al. |
| 7,590,972 | B2 | 9/2009 | Axelrod et al. |
| 7,720,800 | B2 | 5/2010 | Fang et al. |
| 7,933,952 | B2 * | 4/2011 | Parker ................. H04L 12/1813 709/204 |
| 8,032,588 | B2 | 10/2011 | Fang et al. |
| 8,229,984 | B2 | 7/2012 | Khader et al. |
| 8,370,913 | B2 | 2/2013 | Hodgkinson et al. |
| 8,522,323 | B1 | 8/2013 | Zubovsky |
| 8,682,945 | B2 | 3/2014 | Khader et al. |
| 8,800,042 | B2 | 8/2014 | Sima et al. |
| 8,863,111 | B2 | 10/2014 | Selitser et al. |
| 8,973,118 | B2 | 3/2015 | Fitzpatrick, III |
| 9,003,493 | B2 * | 4/2015 | Marum ................... G06F 21/12 705/7.12 |
| 9,158,518 | B2 | 10/2015 | Brown et al. |
| 2003/0208527 | A1 | 11/2003 | Lglesais et al. |
| 2004/0168153 | A1 | 8/2004 | Marvin |
| 2006/0017951 | A1 * | 1/2006 | Tanaka .................. G06F 3/1222 358/1.13 |
| 2006/0265262 | A1 * | 11/2006 | Kamdar ............... G06Q 10/109 705/80 |
| 2008/0005024 | A1 | 1/2008 | Kirkwood |
| 2009/0006936 | A1 * | 1/2009 | Parker ..................... G06F 17/24 715/200 |
| 2009/0132996 | A1 | 5/2009 | Eldridge et al. |
| 2010/0082737 | A1 | 4/2010 | Dankle et al. |
| 2010/0158254 | A1 * | 6/2010 | Schaad ............... G06F 21/6209 380/282 |
| 2010/0251353 | A1 | 9/2010 | Hodgkinson |
| 2012/0144501 | A1 | 6/2012 | Vangpat et al. |
| 2012/0311675 | A1 | 12/2012 | Ham et al. |
| 2013/0179515 | A1 * | 7/2013 | Chi ................... H04L 29/06401 709/206 |
| 2014/0306964 | A1 | 10/2014 | Reddish et al. |
| 2015/0134600 | A1 | 5/2015 | Eisner et al. |
| 2015/0163206 | A1 | 6/2015 | McCarthy et al. |
| 2015/0172271 | A1 | 6/2015 | Barrows et al. |
| 2015/0199188 | A1 | 7/2015 | Mantripragada et al. |
| 2016/0092525 | A1 | 3/2016 | Kothari et al. |
| 2016/0103801 | A1 * | 4/2016 | Bortz .................. G06F 17/2235 715/205 |
| 2017/0048215 | A1 | 2/2017 | Straub |
| 2017/0255546 | A1 | 9/2017 | Chang et al. |
| 2017/0288937 | A1 | 10/2017 | Zhang |
| 2017/0315785 | A1 * | 11/2017 | Flutre ................... H04L 67/141 |

OTHER PUBLICATIONS

Bechara, Gabriel, "Web Services Versioning", Published on: Dec. 12, 2010, Available at: http://www.oracle.com/technetwork/articles/web-services-versioning-094384.html.

Joudeh, Taiseer, "Implement OAuth JSON Web Tokens Authentication in asp.net Web API and Identity 2.1—Part 3", Published on: Feb. 16, 2015 Available at: http://bitoftech.net/2015/02/16/implement-oauth-json-web-tokens-authentication-in-asp-net-web-api-and-identity-2/.

Joudeh, Taiseer, "JSON Web Token in asp.net Web API 2 using Owin", Published on: Oct. 27, 2014 Available at: http://bitoftech.net/2014/10/27/json-web-token-asp-net-web-api-2-jwt-owin-authorization-server/.

International Search Report and Written Opinion issued in Published PCT Application No. PCTUS2017/029499 dated Jun. 21, 2017.

"Final Office Action Issued in U.S. Appl. No. 15/374,726", dated Jul. 25, 2018, 26 Pages.

"Non Final Office Action Issued in U.S. Appl. No. 15/374,726", dated Nov. 15, 2018, 27 Pages.

"Non Final Office Action Issued in U.S. Appl. No. 15/374,726", dated Jan. 24, 2018, 26 Pages.

"International Search Report and Written Opinion Issued in PCT Application No. PCT/US2017/029517", dated Jun. 21, 2017, 11 Pages.

"Office Action Issued in European Patent Application No. 17722582.8", dated Jul. 30, 2019, 5 Pages.

"Final Office Action Issued in U.S. Appl. No. 15/374,726", dated May 9, 2019, 23 Pages.

* cited by examiner

| | Share | Properties | Connections + logic flows | History | |
|---|---|---|---|---|---|

| No. | Version | Modified by | Restore | Delete |
|---|---|---|---|---|
| 5 | 3/25/2016 | ~~~ | ↶ | 🗑 |
| 4 | 11/20/2015 | ~~~ | ↶ | 🗑 |
| 3 | 11/19/2015 | ~~~ | ↶ | 🗑 |
| 2 | 11/18/2015 | ~~~ | ↶ | 🗑 |
| 1 | 11/9/2015 | ~~~ | ↶ | 🗑 |

*Figure 6*

| | Share | Properties | Connections + logic flows | History | |
|---|---|---|---|---|---|

| No. | Version | Modified by | Restore | Delete |
|---|---|---|---|---|
| 5 | 3/25/2016 | ~~~ | ↶ | 🗑 |
| 4 | 11/20/2015 | ~~~ | ↶ | 🗑 |
| 3 | 11/19/2015 | ~~~ | ↶ | 🗑 |
| Are you sure you want to replace the current version with version 3? | | | Restore | Cancel |
| 1 | 11/9/2015 | ~~~ | ↶ | 🗑 |

*Figure 7*

SHARE TOKEN ISSUANCE FOR DECLARATIVE DOCUMENT AUTHORING

CROSS-REFERENCE TO RELATED APPLICATION

This application claims the benefit of U.S. Provisional Patent Application Ser. No. 62/329,098, filed Apr. 28, 2016, which provisional patent application is incorporated herein by reference in its entirety.

BACKGROUND

A declarative document is a collection of declarations that represent the logic of a computation rather than describing the lower level control flow. Because those declaration are often more human-readable, the collection of declarations is often termed a "document" rather than a "program". Furthermore, the creation of such a document is often termed "authoring" rather than "programming".

Because declarations are more human-readable and intuitive to most human beings, more individuals are capable of authoring declarative documents than are capable of programming using an imperative or object-oriented language. Accordingly, a declarative authoring experience is distinct from a computer programming experience. In a declarative authoring experience, it seems to the user as though the user is authoring a document, though after compilation, the document may consist of computer-executable code. The document may be, for instance, be a transformation chain or graph that has associated state. A transformation chain is an interconnected set of nodes that each may represent data sources or data targets.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to the issuance of job tokens performed by an authorization computing entity so that authoring authorizations can be shared with other authors. Each of the job tokens represents an authorization to engage in a particular manner in an authoring session in which a declarative document is being authored. In accordance with the principles described herein, that engagement includes sharing one or more authorizations with other possible author. The declarative document is a computer program in the form of declarative statements made in a declarative programming language. The management occurs by evaluating incoming requests to engage in various ways in an authoring session.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 6 shows a user interface which illustrates to the user the version of a declarative document that will work with a specific device and with a specific version of the application document available on the device; and FIG. 7 illustrates the user interface that appears should the user select on version 3 in the user interface of FIG. 6, and in which the user is given an indication that they can replace the current version of the declarative document with the selected version.

DETAILED DESCRIPTION

Figure 1:
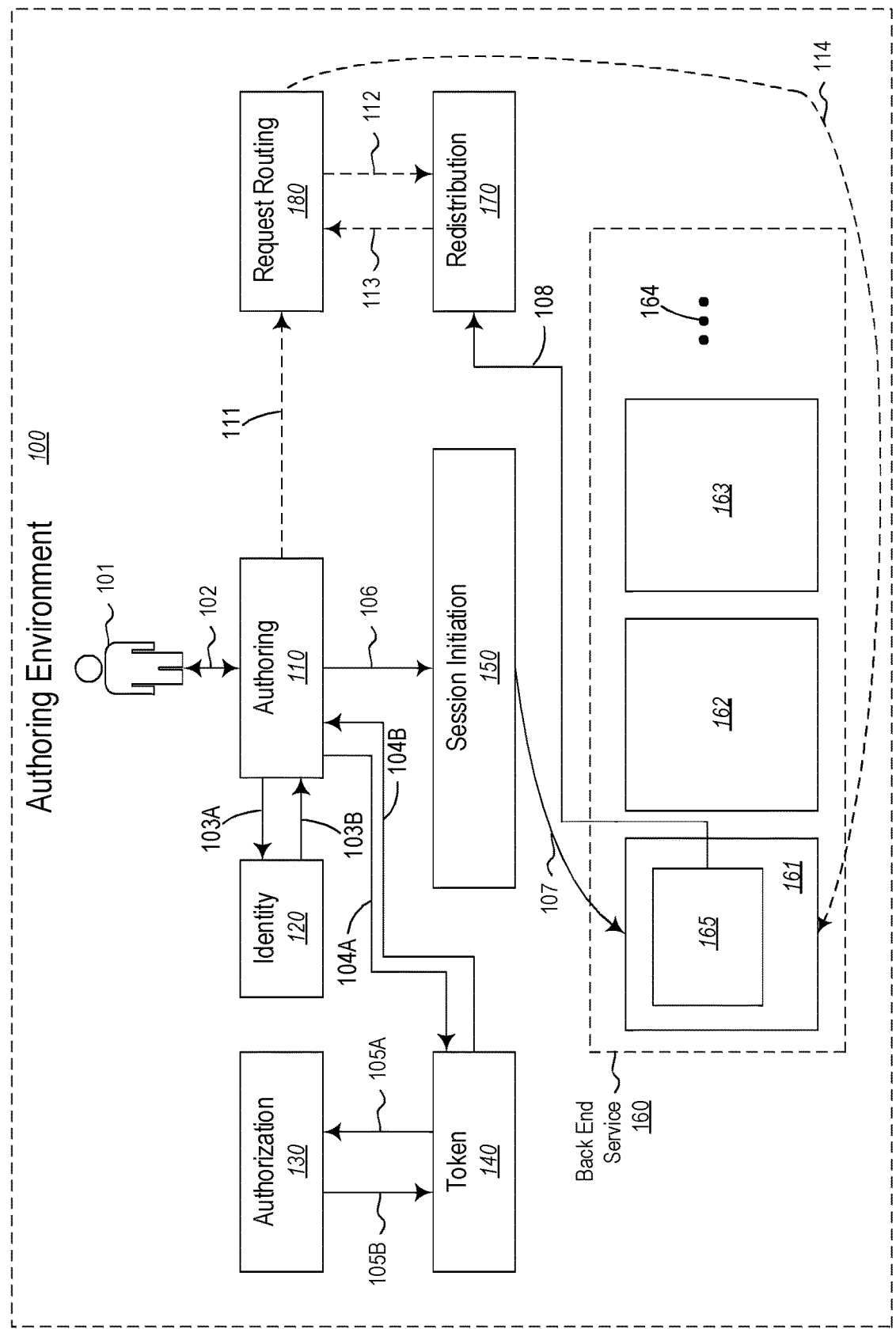
FIG. 1 symbolically illustrates an authoring environment in accordance with the principles described herein, and which includes a variety of communication flows used to accomplish the principles described herein.

The principles described herein provide an application authoring environment. In some embodiments, the application may generate via a declarative authoring experience in which it seems to the user as though the user is authoring a document, via higher-level human-readable declaration. After compilation, the document may consist of computer-executable code. The document (also called herein a "declarative document") may be, for instance, a transformation chain or graph that has associated state. A transformation chain is an interconnected set of nodes that each may represent data sources or data targets.

In the case that the declarative document represents a transformation chain or graph, there are links between the nodes, each link representing a transformation. For any given link, the associated transformation receives copies of values of one or more data sources situated at an input end to the link, and generates resulting values being provided at one or more data targets located at the output end of the link. For any given transformation, when a value at one or more of the data sources at its input end changes, the transformation is automatically reevaluated, potentially resulting in changes in value(s) of one or more data targets at the output end of the transformation. The role of nodes and links may of course reverse, with nodes representing data flows, and links representing transformations.

In one embodiment, regardless of how complex the transformation chain is, the transformations may be constructed from declarative statements expressing equations, rules, constraints, simulations, or any other transformation type that may receive one or more values as input and provide the resulting one or more values as output. Transformation chains may be augmented as a program is built by linking different transformation chains to honor the dependencies between the chains. Portions of transformation chains may also be delegated to other devices and/or users. Nodes of the transformation graph may encapsulate specific data included within a given data set/data table (e.g., data included within a data field of a data table), which data may be visualized in a generated application, as described herein.

At least some embodiments described herein relate to the issuance of job tokens performed by an authorization computing entity so that authoring authorizations can be shared with other authors. For instance, the share authorization may allow the particular identity to share edit authorization, read authorization, or share authorization with one or more other identities. Furthermore, such shared authorization may be with respect to the entirety of the declarative document being authored, or with respect to just a portion of the declarative document being authored.

One benefit of using a declarative document is that dependencies of every document entity are traceable and known, which allows a subset of the document to be safely shared. For example, suppose that a single screen of an application is shared for edit. If the application is described via a declarative document, the system can trace back every single dependency (e.g. controls on other screens, data sources, external functions, and so forth) and apply suitable permissions too.

Each of the job tokens represents an authorization to engage in a particular manner in an authoring session in which a declarative document is being authored. In accordance with the principles described herein, that engagement includes sharing one or more authorizations with other possible author. The declarative document is a computer program in the form of declarative statements made in a declarative programming language. The management occurs by evaluating incoming requests to engage in various ways in an authoring session.

FIG. 1 illustrates an authoring environment 100 in accordance with the principles described herein. The authoring environment 100 includes an authoring computing system 110 that communicates with (as represented by arrow 102) an associated user 101. The authoring computing system 110 also communicates with an authoring service in order to author a declarative document. In this description and in the claims, the terms "author" and "document" will be used often in lieu of "coder" and "program" as the program is coded in declarative form and thus may have the sense of being a document (e.g., a MICROSOFT EXCEL) document, and the coder is dealing with declarative statements more than imperative code.

The authoring environment 100 also includes an identity service 120, an authorization service 130, a token service 140, a session initiation service 150, a backend service 160, a redistribution service 170, and a request rerouting service 180. Each of the services 120, 130, 140, 150, 160, 170 and 180 may be accessible to multiple users engaging in multiple sessions on multiple versions of multiple documents. As the computing system 110, and each of the various services 120, 130, 140, 150, 160, 170 and 180, may be offered by a stand-alone and/or distributed computing system, a computing system will now be described with respect to FIG. 2. Then, the operation of the authoring environment 100 will be further described with respect to FIGS. 3 through 5. Then, the implementation of versioning with respect to the authoring environment will be described with respect to FIGS. 6 and 7.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 2:
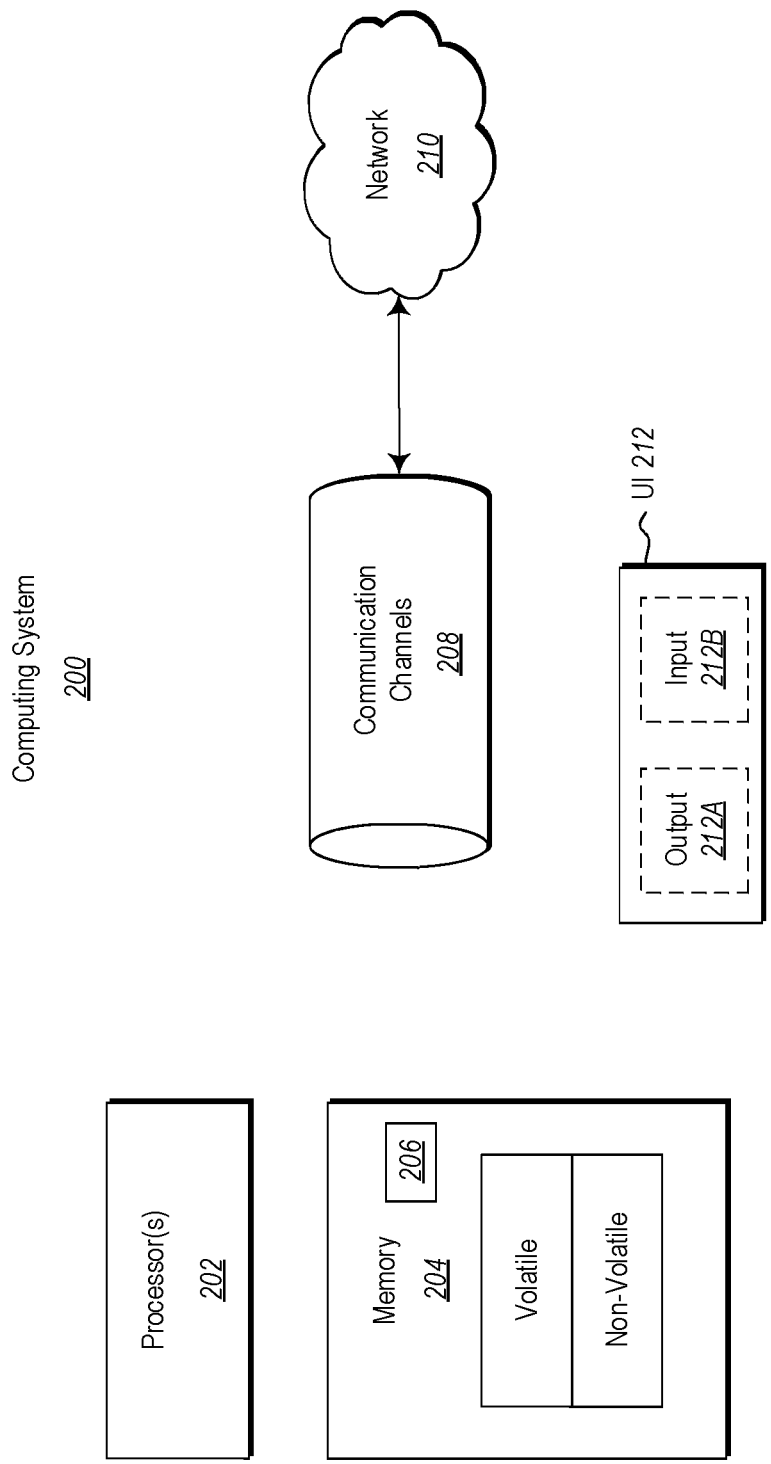
FIG. 2 illustrates a computing system in which the principles described herein may operate.

As illustrated in FIG. 2, in its most basic configuration, a computing system 200 typically includes at least one hardware processing unit 202 and memory 204. The memory 204 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 200 also has thereon multiple structures often referred to as an "executable component". For instance, the memory 204 of the computing system 200 is illustrated as including executable component 206. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component" and "service", or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 204 of the computing system 200. Computing system 200 may also contain communication channels 208 that allow the computing system 200 to communicate with other computing systems over, for example, network 210.

While not all computing systems require a user interface, in some embodiments, the computing system 200 includes a user interface 212 for use in interfacing with a user. The user interface 212 may include output mechanisms 212A as well as input mechanisms 212B. The principles described herein are not limited to the precise output mechanisms 212A or input mechanisms 212B as such will depend on the nature of the device. However, output mechanisms 212A might include, for instance, speakers, displays, projectors, tactile output, valves, actuators, holograms, virtual reality, and so forth. Examples of input mechanisms 212B might include, for instance, microphones, touchscreens, holograms, virtual reality controls, cameras, keyboards, accelerometers, levers, pedals, buttons, knobs, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate, after having read this description, that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate, after having read this description, that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Returning to FIG. 1, the operation of the authoring environment 100 to securely start a stateful session for purposes of generating a declarative document will now be described with respect to FIGS. 1, 3 through 5. Thereafter, versioning in the context of the authoring of declarative documents will be described with respect to FIGS. 6 and 7.

A user 101 interfaces (as represented by arrow 102) with an authoring computing system 110. The user 101 is a member of a particular identity that requests to engage in an authoring session to begin and/or continue authoring of a declarative document. Alternatively, the user 101 is that particular entity that requests to engage in the authoring session.

The process of initiating a stateful session in response to such user interaction will now be described. The user 101 interfaces with the authoring computing system 110 so as to indicate an intent to initiate an authoring session to thereby author a declaratory document. The authoring computing system 110 responds by sending (as represented by arrow 103A) a request for an identity token from an identity service 120. The identity token may be used to prove that the possessor thereof is of a particular identity. The identity service 120 responds (as represented by arrow 103B) by providing the identity token back to the authoring computing system 110. As an example, if one or more of the services of FIG. 1 were hosted within a public cloud computing environment, and that public cloud environment were the MICROSOFT® AZURE™ public cloud, then the identity service 120 might be the AZURE™ ACTIVE DIRECTORY®.

The authoring computing system 110 then provides (as represented by arrow 104A) that identity token to the token service 140 with a request to perform a job. The job request represents a request to perform a certain scope of engagement in an authoring session in which the declarative document is authored. The token service 140 then, if appropriate, issues a job token that includes an authorization to perform at least the requested job (which in this cases is to initiate an authoring session).

Figure 3:
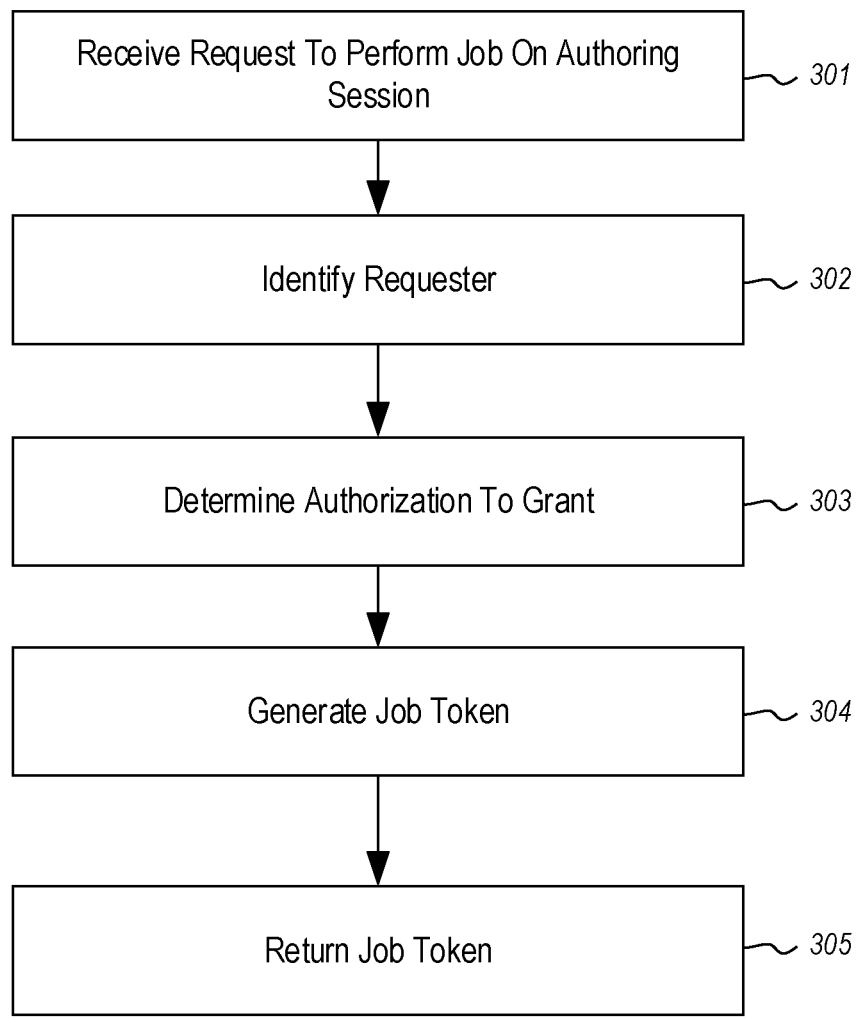
FIG. 3 illustrates a flowchart of a method for issuing a job token in response to a request to engage in an authoring session in which a declarative document is being authored.

FIG. 3 illustrates a flowchart of a method 300 for issuing a job token. The method 300 may be performed by the token service 140 each time the token service 140 receives a request to perform a job in an authoring session in which the declarative document is being authored. The method is initiated upon receiving a particular request to perform a job in that authoring session (act 301). This receipt is represented by arrow 104A of FIG. 1.

For instance, to initiate an authoring session, a request to initiate a session is received by the token service 140. In one embodiment, the job token returned in response to that request describes the full range of authorization of the requestor including authorization to initiate the authoring session, as well as authorization to perform other actions to author the declarative document. In other embodiments, the requestor must issue another distinct request to initiate the session, and another distinct request each time the requestor wishes to expand upon that authorization (e.g., by continuing in the authoring session).

In order to attach to an existing session that another author initiated, a request to attach to an existing authoring session may be received. In one embodiment, the job token returned in response to that request describes the full range of authorization of the requestor including authorization to attached to the authoring session, as well as authorization to perform other actions to contribute to authoring the declarative document. In other embodiments, the requestor must issue another distinct request to attached to the session, and another distinct request each time the requestor wishes to expand upon that authorization (e.g., by continuing in the authoring session).

Upon receipt of any of such requests, the token service 140 then identifies the particular identity that is associated with the request (act 302). As described above, since the request includes the identity token issued to the authoring computing system 110 by the identity service 120 (as represented by arrow 103A), this identification may be performed by examination of that identity token. However, the principles described herein are not limited to how the token service 140 authenticates the identity associated with the request. The particular identity might be a single user or a group of users. A user may be human user or an artificial intelligence capable of authoring.

The token service 140 then determines an authorization to grant to the particular identity (act 303). For instance, in FIG. 1, this authorization scope was determined via the token service 140 interacting (as represented by arrows 105A and 105B) with the authorization service 130. The authorization service 130 may authorize in a manner that for any given authoring session, there are no potentially colliding authorizations. The token service 140 then constructs an appropriate job token (act 304), and provides that job token to the authoring computing system (act 305). For instance, in FIG. 1, arrow 104B represents this returning of the job token.

As examples only, the authorization could be directed towards the entirety of the declarative document or an identified portion of the declarative document. Alternatively, or in addition, the authorization might be defined by the scope of actions allowed. As an example only, such scope might include read authorization allowing the particular identity to read the declarative document (or a designated portion(s)). Alternatively or in addition, the scope might include an edit authorization which might allow the particular identity to edit the declarative document (or a designated portion). Alternatively or in addition, the scope might include publish authorization allowing the particular identity to publish the declarative document (or a designated portion(s)). Alternatively or in addition, the scope might include a share authorization allowing the particular identity to share at least one authorization with another identity, and so forth for other possible authorization.

The job token also includes a unique session identifier (which may be a globally unique identifier or "GUID"), as well as other metadata about the session in which the declarative document is being authored. For instance, the job token may include an identification of which application documents that the authoring entity may engage in a session with, what the permissions may be (read-only, edit, share), the expiration period for the identity token, the expiration period for the job token, renewal terms for the identity token and the job token, and so forth. The job token is signed to allow for detection of tampering should the job token be altered. The job token serves as the authoring identity's passport when submitted subsequent commands related to the same authoring session.

When initiating a session, the authoring entity then requests (as represented by arrow 106) to begin a session to the session initiation service 150. The session initiation service verifies that the session initiation is authorized by checking the job token that is within the request. If the verification is successful, the session request is placed in a predetermined queue that back end systems may draw from to host authoring sessions. In one example, the queue may take the form of an AZURE™ queue. For instance, in this example, the back end service 160 includes three illustrated back end systems 161 through 163 though the ellipses 164 represents that the back end service 160 may include any number of back end systems. The back end systems may each be, for instance, host servers within a cloud computing environment. The back end system 161 may take responsibility for hosting the request session as represented by the arrow 107.

To begin loading an associated application document to work on in the session, a document server host 165 is prepared on the back end system 161. The back end system 161 then publishes (as represented by arrow 108) to a redistribution service 170 that the document server host 165 has taken responsibility for the authoring session. The redistribution service 170 may have many nodes that are distributed. Accordingly, the arrow 108 represents a publishing process whereby all distributed nodes of the redistribution service 170 are notified that the back end system 161 is hosting the authoring session. In a similar manner, the redistribution service 170 may be keeping track of enumerable sessions by the session identifier GUID, and an associated Internet Protocol (IP) address and port that allows for routing to the appropriate back end system that is hosting that session.

When future commands come in related to that session (e.g., from the authoring computing system or from another user), that command will come into (as represented by arrow 111) the request routing service 180 with the job token provided by the token service 140 for that session. That request routing service 180 will refer to the nearest redistribution service 170 (as represented by arrow 112) to identify (as represented by arrow 113) the network address (e.g., the appropriate IP address and port) for the document server host that is handling that session. Thus, the command from the authoring computing system 110 may be passed forward to the appropriate back end system that is hosting the session. For instance, future commands associated with the session being hosted within the document server host 165 will be routed (as represented by arrow 114) to the back end system 161 and ultimately to the document server host 165.

When the document server host 165 first comes into existence on a back end system, the document server host 165 may perhaps be empty. It is the job of the document server host 165 (for the duration of the session) to receive commands from one or more participants in the session. For instance, a command might be to load a declarative document being authored into the document server host, to edit the declarative document that is presently within the document server host, to save the declarative document that is presently within the document server host, to remove the declarative document that is presently within the document server host, and so forth.

Figure 4:
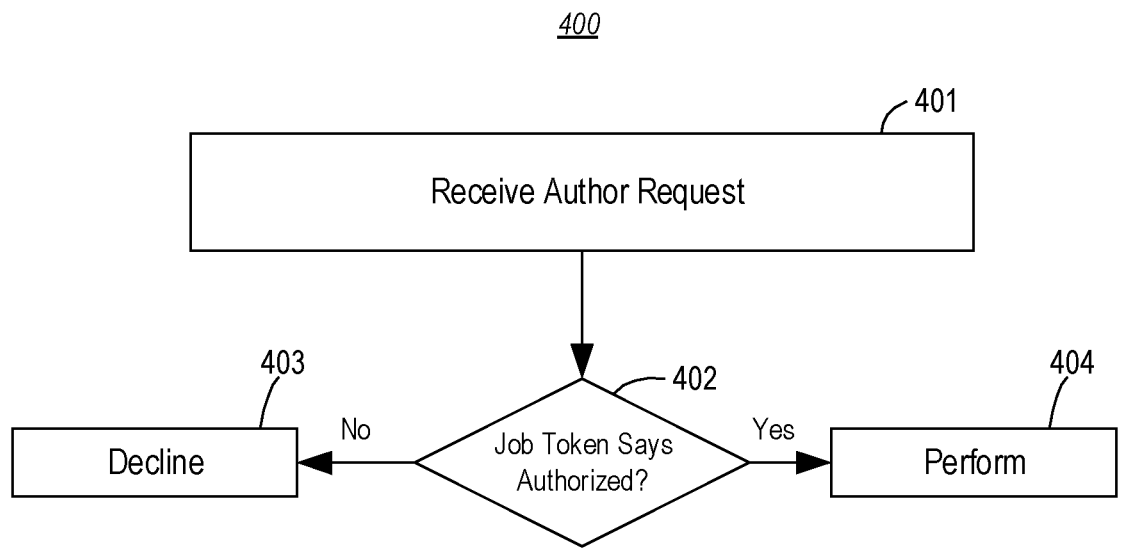
FIG. 4 illustrates a flowchart of a method for managing an authoring session in which a declarative document is being authored.

FIG. 4 illustrates a flowchart of a method 400 for managing an authoring session in which a declarative document is being authored. The method 400 is performed each time a request to engage in an authoring session is received (act 401). If the request is to initiate an authoring session, the method 400 may be accomplished by the session initiation service 150. If the request is to attach to an existing authoring session, the method 400 may be accomplished by the request routing service 180 updating the redistribution service 170 to reflect attachment of a new user. If the request is to continue the existing authoring session by reading or editing the declarative document, the method 400 may be performed by the document server host 165.

Once receiving the request, the appropriate component determines whether the requestor is authorized to engage in the authoring session as requested (decision block 402). If the user is not authorized based on this determination ("No" in decision block 402), then the request to engage in the session is declined (act 403). Otherwise, if the user is authorized based on this determination ("Yes" in decision block 402), then the request is granted (act 404).

For instance, if the request is to initiate an authoring session, if permitted by the job token, the session initiation service 150 initiates the authoring session by assigning a backend service 160 that thereby establishes a document server host, which then publishes itself (as represented by arrow 108) to the redistribution service 170. If the request is to attach to an authoring session, if permitted by the job token, the request routing service 180 updates the redistribution service 170 to reflect the new author. If the request is to edit the declarative document by a current author that is already registered in the session, then the document service host 165 allows the edit if permitted by the job token.

There may be a number of versions of the document server host that are potentially available, each perhaps offering somewhat different application program interfaces for authoring the declarative document contained within the document server host. In such a multi-versioned environment, it is important that the authoring computing system 110 provide the appropriate commands that will be recognized by the version of the document server host that the authoring computing system expects to be communicating with. Accordingly, when establishing a secure authoring session, the authoring computing system may also specify a version of the document server host that the authoring computing system is to engage with during the session. This session information is carried forward throughout establishment of the session and is ultimately saved in the redistribution service.

Figure 5:
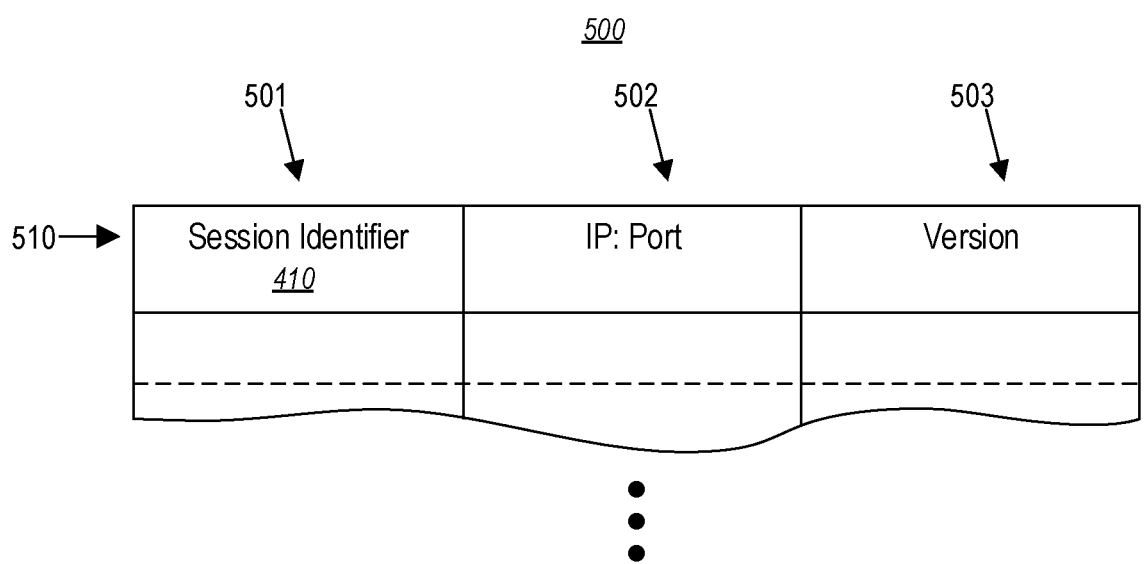
FIG. 5 illustrates a session that shows at least all active sessions for which there is a document server host running within a back end service.

As illustrated in FIG. 5, the redistribution service 170 includes a session table 500 that shows at least all active sessions for which there is a document server host running within the back end service 160. There is an entry (e.g., entry 510) for each session. When a command for a session is received by the routing service 180 from the authoring computing system 110, the command will include the job token (from which the session identifier 501 may be obtained). The command may also specify a version of the document server host that the authoring computing system expects to deal with. This version is also included within the job token. Accordingly, when the back end server that establishes the document server host receives a request for a new session to be started, the back-end system may load the appropriate version of the document server host with the appropriate dynamic link library.

In accordance with the principles described herein, concurrent authoring is also enabled. This is done by having multiple job tokens associated with a particular session. The first job token associated with a session was obtained and used by the authoring entity (e.g., the authoring computing system 110 and/or or user 101). However, a second job token is associated with an authoring entity that simply wants to participate in the session (e.g., by reading or editing the document hosted within the document server host of the session).

The establishment of the second token may be performed in a similar manner as the first token was established. The user of an authoring computing system requests to attach to an existing session. An identity token is obtained from the identity service 120. The authorization service 130 then provides authorization for the authenticated entity to attach to a particular session. The token service 140 then generates a signed job token indicating that this second authoring entity has authorization to attach to the same session. The second job token is now the passport for the second user to participate in the same session as the first authoring entity. The attachment request is then sent to the routing service 180, which identifies the session and document server version based on the second job token, identifies the second user as authorized to attach to the session, and adds the second job token as permissible to use the same entry created when processing the first token. The second user is then attached to the session as subsequent commands from the second user (including the second job token) will cause the commands to be redirected towards the same document server host that the first user is engaging with.

A user experience associated with restoring and deleting versions of declarative documents will now be described. Authors and editors of declarative documents have the ability to view all of the previous versions of the declarative document that were ever created. They can pick a specific version to restore which replaces the current version of the declarative document as its latest version. The version count goes up by one and is ordered in a descending order in the user interface. The authors and editors of the resource can also delete older versions that are no longer useful.

The History user interface is laid out with all the versions available in the same view with the options to restore and delete prior versions from the same screen, in a couple of clicks. The users can do restore/delete just previous versions and not the current version, represented by the representative iconography on the History user interface screen. After clicking on any of these icons, the user can choose to proceed with or discard the operation in the in-line confirmation, again on the History user interface.

On a specific device, the users will see just the versions that will work with the specific device and with the version of the application document available on that device. FIG. 6, for instance, shows a user interface in which there are five versions of an application document available. For each version, the version date and time are given, along with the individual who last made the edit. For prior versions previous to the latest version, an option is given to restore or delete that version.

FIG. 7 shows what happens to the user interface when the user selects on version 3. The user is given an indication that they can replace the current version of the application document with the selected version. The user may cancel the restoration or proceed with the restoration.

In some embodiment, the user may compare and contrast versions of the application documents by viewing metadata of the versions (such as sharee information and connections associated with the application or by viewing running versions of the application in a new tab), to decide which version to restore.

Thus, the principles described herein provide an effective mechanism for authoring application documents in the context in which there may be multiple versions of environments (e.g., document server host) that may be used to author the document, there may be concurrent authoring, and there may be multiple versions of the document itself). Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method, implemented at a computer system comprising one or more physical hardware processor(s), for issuing a plurality of job tokens, each of the plurality of job tokens authorizing engagement in an authoring session in which a declarative document is authored for compilation into an executable application, the method, which is implemented by the one or more physical hardware processor(s) of the computer system, comprising:

generating, by the one or more physical hardware processor(s) of the computer system, the declarative document, wherein the declarative document comprises a plurality of nodes connected by a plurality of links, at least one link in the plurality of links representing a data transformation that occurs between a first node and a second node of the plurality of nodes, the first node and the second node being connected by the at least one link;

receiving, at the computer system, a request from a first entity to perform a first job in the authoring session in which the declarative document is to be authored;

determining, by the one or more physical hardware processor(s) of the computer system, a share authorization to grant to the first entity, the share authorization allowing the first entity to at least:
perform the first job in the authoring session; and
share at least one additional authorization with a second entity to perform a second job, wherein the at least one additional authorization allows the second entity to perform an edit function on a specific node representing a portion of the declarative document;

generating, by the one or more physical hardware processor(s) of the computer system, a job token that is structured to be interpretable as a representation that grants the first entity the share authorization so as to allow the first entity to use that job token to share the at least one additional authorization with the second entity to perform the second job;

transmitting, from the computer system, the generated job token to the first entity.

2. The method in accordance with claim 1, further comprising:
authenticating that the first entity is associated with the request.

3. The method in accordance with claim 2, wherein authenticating that the first entity is associated with the request comprises:
accessing an identity token with the request, the identity token issued by an identity service; and
verifying that the identity token represents that the identity token is associated with the first entity.

4. The method in accordance with claim 1, the method further comprising:
signing the generated job token.

5. The method in accordance with claim 4, further comprising:
providing the signed job token to a requestor that submitted the request.

6. The method in accordance with claim 1, further comprising:
providing the generated job token to a requestor that submitted the request.

7. The method in accordance with claim 1, the share authorization that allows the first entity to share the at least one additional authorization with the second entity comprising:
an authorization to allow the first entity particular access to the entire declarative document.

8. The method in accordance with claim 1, the share authorization that allows the first entity to share the at least one additional authorization with the second entity comprising:
an authorization to allow the first entity particular access to the portion of the declarative document.

9. The method in accordance with claim 8, the particular access being an edit access.

10. The method in accordance with claim 8, the particular access being a read access.

11. The method in accordance with claim 8, the particular access being a share access that allows the first entity to further share access with a third entity.

12. The method in accordance with claim 1, the first entity being a single user.

13. The method in accordance with claim 1, the first entity being a group comprising multiple users.

14. A computing system comprising:
one or more physical hardware processor(s); and
one or more computer-readable physical hardware storage device(s) having stored thereon computer-executable instructions that are executable by the one or more physical hardware processor(s) to cause the computing system to issue a plurality of job tokens, each of the plurality of job tokens authorizing engagement in an authoring session in which a declarative document is authored for compilation into an executable application, by causing the computing system to at least:
generate, by the one or more physical hardware processor(s) of the computing system, the declarative document, wherein the declarative document comprises a plurality of nodes connected by a plurality of links, at least one link in the plurality of links representing a data transformation that occurs between a first node and a second node of the plurality of nodes, the first node and the second node being connected by the at least one link;
receive, at the computing system, a request from a first entity to perform a first job in the authoring session in which the declarative document is authored;
determine, by the one or more physical hardware processor(s) of the computing system, a share authorization to grant to the first entity, the share authorization allowing the first entity to at least:
perform the first job in the authoring session; and
share at least one additional authorization with a second entity to perform a second job, wherein the at least one additional authorization allows the second entity to perform an edit function on a specific node representing a portion of the declarative document;
generate, by the one or more physical hardware processor(s) of the computing system, a job token that is structured to be interpretable as a representation that grants the first entity the share authorization to allow the first entity to use that job token to share the at least one additional authorization with the second entity to perform the second job;
transmit, from the computing system, the generated job token to the first entity.

15. The computing system of claim 14, wherein concurrent authoring is enabled, the concurrent authoring allowing for multiple job tokens to be associated with the authoring session, and
wherein a first job token included among the plurality of job tokens is associated with an authoring entity of the declarative document while a second job token is associated with an entity that is only participating in the authoring session by performing read operations.

16. The computing system in accordance with claim 14, the share authorization that allows the first entity to share the at least one additional authorization with the second entity comprising:
an authorization to allow the first entity particular access to at least the portion of the declarative document.

17. The computing system in accordance with claim 16, the particular access being an edit access.

18. The computing system in accordance with claim 16, the particular access being a read access.

19. The computing system in accordance with claim 16, the particular access being a share access that allows the first entity to further share access with a third entity.

20. One or more computer-readable physical hardware storage device(s) having stored thereon computer-executable instructions that are executable by one or more physical hardware processor(s) of a computer system to cause the computer system to issue a plurality of job tokens, each of the plurality of job tokens authorizing engagement in an authoring session in which a declarative document is authored for compilation into an executable application, by causing the computer system to at least:
generate, by the one or more physical hardware processor(s) of the computer system, the declarative document, wherein the declarative document comprises a plurality of nodes connected by a plurality of links, at least one link in the plurality of links representing a data transformation that occurs between a first node and a second node of the plurality of nodes, the first node and the second node being connected by the at least one link;

receive, at the computer system, a request from a first entity to perform a first job in the authoring session in which the declarative document is to be authored;

determine, by the one or more physical hardware processor(s) of the computer system, a share authorization to grant to the first entity, the share authorization allowing the first entity to at least:

perform the first job in the authoring session; and share at least one additional authorization with a second entity to perform a second job, wherein the at least one additional authorization allows the second entity to perform an edit function on a specific node representing a portion of the declarative document;

generate, by the one or more physical hardware processor(s) of the computer system, a job token that is structured to be interpretable as a representation that grants the first entity the share authorization so as to allow the first entity to use that job token to share the at least one additional authorization with the second entity to perform the second job;

transmit, from the computer system, the generated job token to the first entity.

\* \* \* \* \*